United States Patent
Pinon

(10) Patent No.: US 11,916,480 B2
(45) Date of Patent: Feb. 27, 2024

(54) SWITCHED MODE POWER SUPPLY

(71) Applicant: STMicroelectronics (Grenoble 2) SAS, Grenoble (FR)

(72) Inventor: Vincent Pinon, Voiron (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 120 days.

(21) Appl. No.: 17/495,306

(22) Filed: Oct. 6, 2021

(65) Prior Publication Data

US 2022/0109370 A1    Apr. 7, 2022

(30) Foreign Application Priority Data

Oct. 7, 2020  (FR) ...................................... 2010245

(51) Int. Cl.
*H02M 3/158* (2006.01)
*H02M 1/08* (2006.01)
*H02M 1/00* (2006.01)

(52) U.S. Cl.
CPC ............. *H02M 3/158* (2013.01); *H02M 1/08* (2013.01); *H02M 1/0045* (2021.05)

(58) Field of Classification Search
CPC .... H02M 3/156; H02M 3/158; H02M 3/1588; H02M 3/155; H02M 3/1582; H02M 3/157; H02M 3/1563; H02M 3/1584; H02M 1/32; H02M 1/081–084; H02M 1/0006; H02M 2003/1566; H02M 2003/1557; H02M 2001/0012; H02M 2001/0009; H02M 2001/385; H04B 2215/069

See application file for complete search history.

(56) References Cited

U.S. PATENT DOCUMENTS

| | | | |
|---|---|---|---|
| 7,940,118 B1 * | 5/2011 | Forghani-zadeh | H02M 3/155 327/536 |
| 2005/0242787 A1 | 11/2005 | Shirokoshi et al. | |
| 2016/0336859 A1 | 11/2016 | Ngai et al. | |
| 2021/0083573 A1 * | 3/2021 | Yen | H02M 3/07 |

OTHER PUBLICATIONS

Renesas, "Automotive 42V Dual Synchronous Boost and Low-Iq Buck Controllers with Integrated Driver," Datasheet, SL78263, Jul. 24, 2020, 37 pages.

* cited by examiner

Primary Examiner — Bryan R Perez

(74) Attorney, Agent, or Firm — Slater Matsil, LLP

(57) ABSTRACT

In an embodiment, A switched-mode power supply includes: a first node; a second node configured to receive a DC input voltage; a third node configured to receive a reference voltage; first and second switching transistors; a first circuit configured to control the first switching transistor; and a second circuit configured to control the second switching transistor, wherein the switched-mode power supply is configured to deliver a regulated output voltage at the first node from the DC input voltage, and wherein the first and second circuits are configured to be powered from the output voltage.

27 Claims, 2 Drawing Sheets

This application claims the benefit of French Patent Application No. 2010245, filed on Oct. 7, 2020, which application is hereby incorporated herein by reference.

SWITCHED MODE POWER SUPPLY

CROSS-REFERENCE TO RELATED APPLICATIONS

TECHNICAL FIELD

The present disclosure relates generally to an electronic system and method, and, in particular embodiments, to a switched mode power supply (SMPS).

BACKGROUND

In a switched-mode power supply (also called switched-mode converter), a power supply potential delivered to an input of the switched-mode power supply is switched (or chopped) by the switching of metal-oxide semiconductor (MOS) transistors to implement phases of power storage in an inductive element or inductance and phases of delivery, to a load connected at the output of the switched-mode power supply, of the power stored in this inductive element.

SUMMARY

There is a need to overcome all or part of the disadvantages of known switched-mode power supplies, for example, of known step-up or boost-type switched-mode power supplies delivering a DC output potential higher than a DC input potential.

An embodiment overcomes all or part of the disadvantages of known switched-mode power supplies, for example, of known boost-type switched-mode power supplies.

An embodiment provides a switched-mode power supply configured to deliver a (e.g., regulated) DC output potential on a first node from a DC input potential, the switched-mode power supply comprising:
  a second node configured to receive the input potential;
  a third node configured to receive a reference potential;
  a first and a second switching MOS transistors;
  a first circuit for controlling the first transistor; and
  a second circuit for controlling the second transistor, wherein the first and second circuits are powered from the output potential.

According to an embodiment, a set point value of the output potential is greater than a value of the input potential.

According to an embodiment, the switched-mode power supply comprises a low drop-out regulator configured to deliver an intermediate potential from the output potential, the first and second circuits being powered from the intermediate potential.

According to an embodiment, the intermediate potential is smaller than the output potential and, preferably, higher than the input potential.

According to an embodiment:
  the first transistor is connected between the third node and a fourth node; and
  the second transistor is connected between the fourth node and the first node, the switched-mode power supply further comprising an inductance coupling the second node to the fourth node.

According to an embodiment, the switched-mode power supply comprises a charge pump configured to deliver, to a fifth node, a power supply potential equal to a sum of the intermediate potential and of the potential of the fourth node, the first circuit being powered with the intermediate potential and the second circuit being powered with the power supply potential.

According to an embodiment, the charge pump comprises:
  a diode having a first electrode, preferably an anode, connected to an output node of the regulator configured to deliver the intermediate potential, and a second electrode, preferably a cathode, connected to the fifth node, or a MOS transistor having a source connected to the output node, a drain connected to the fifth node, and a gate receiving a control signal; and
  a capacitive element connected between the fourth node and the fifth node.

According to an embodiment, the charge pump further comprises a circuit for controlling the regulator configured to deliver a set point value of the intermediate potential to the regulator.

According to an embodiment, the circuit for controlling the regulator is configured to select the set point value of the intermediate potential from among a plurality of set point values according to an operating mode of the switched-mode power supply selected from among a plurality of operating modes.

According to an embodiment, the regulator comprises:
  a third MOS transistor having a first conduction terminal coupled, preferably connected, to the first node and a second conduction terminal configured to deliver the intermediate potential; and
  an operational amplifier having a first input, preferably inverting, configured to receive a potential representative of the set point value of the intermediate potential, a second input, preferably non-inverting, coupled to said second terminal and configured to receive a potential representative of a current value of the intermediate potential, and an output coupled, preferably connected, to a control terminal of the third transistor.

According to an embodiment, the regulator further comprises:
  a capacitive element connected between the second terminal and the third node;
  a resistor coupling the second terminal and the second input of the amplifier; and
  a current source connected between the third node and the second input of the amplifier, preferably, the regulator further comprising a diode connected between the second terminal and the second node.

According to an embodiment, the first node is configured to be connected to a first electrode of an output capacitive element having a second electrode connected to the third node, the switched-mode power supply further comprising a third circuit coupling the second node to the first node, the third circuit being configured to precharge the output capacitive element from the input potential, the third circuit preferably comprising a switch coupling the second node to the first node.

According to an embodiment, the first and second MOS transistors have an N channel.

An embodiment provides a method implemented in a switched-mode power supply, the method comprising a step of electrically powering a first circuit for controlling a first switching MOS transistor of the switched-mode power supply and a second circuit for controlling a second switching MOS transistor of the switched-mode power supply from an output potential of the switched-mode power supply, the switched-mode power supply being preferably a switched-mode power supply such as described hereinabove.

According to an embodiment, the method comprises:
- a step of generating, with a low-drop voltage regulator, an intermediate potential from the output potential, the first and second circuits being electrically powered from the intermediate potential;
- a step of selecting an operating mode of the switched-mode power supply from among a plurality of operating modes; and
- a step of delivering a set point value of the intermediate potential to the regulator, the set point value being determined by the selected operating mode.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the usual circuits and electronic systems comprising a switched-mode power supply have not been described, the described embodiments, implementation modes, and variants being compatible with such usual circuits and systems.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front," "back," "top," "bottom," "left," "right," etc., or to relative positional qualifiers, such as the terms "above," "below," "upper," "lower," etc., or to qualifiers of orientation, such as "horizontal," "vertical," etc., reference is made to the orientation shown in the figures.

Unless specified otherwise, the expressions "around," "approximately," "substantially," and "in the order of," signify within 10%, and preferably within 5%.

In the following description, unless specified otherwise, all potentials are referenced to a same reference potential, typically ground potential GND.

Figure 1:
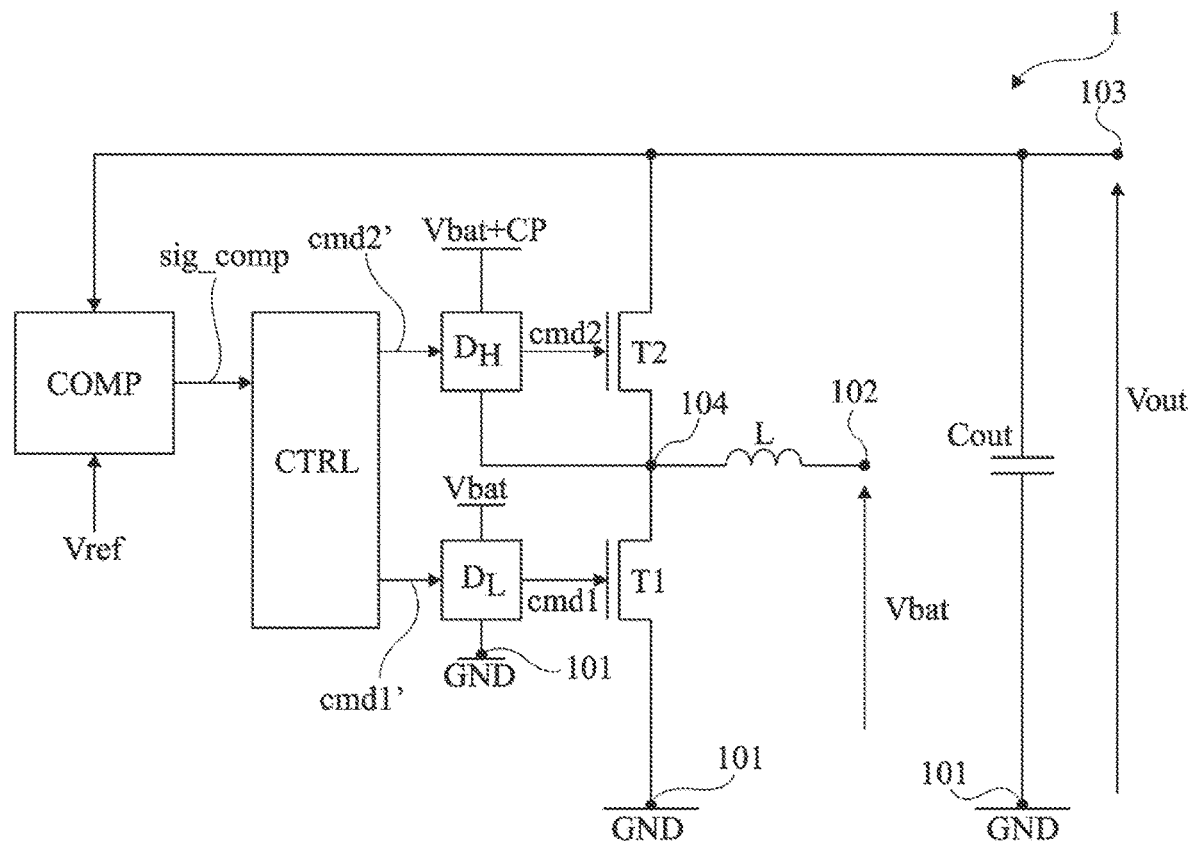
FIG. 1 illustrates an example of a boost-type switched-mode power supply.

FIG. 1 illustrates an example of a switched-mode power supply 1, switched-mode power supply 1 being of boost type.

Switched-mode power supply 1 comprises a node 101 configured to receive a reference potential, typically ground GND.

Switched-mode power supply 1 comprises a node 102 configured to receive a DC input potential Vbat. Potential Vbat is positive. As an example, potential Vbat is delivered by a battery of an electronic system comprising switched-mode power supply 1.

Switched-mode power supply 1 comprises a node 103. Switched-mode power supply 1 is configured to deliver a DC output potential Vout on node 103. Potential Vout is positive. In the case where switched-mode power supply 1 is of boost type, switched-mode power supply 1 is configured to deliver potential Vout equal to a set point value Vref greater than the value of potential Vbat.

Nodes 101 and 103 are intended to be connected to respective electrodes or terminals of an output capacitive element Cout. In FIG. 1, capacitive element Cout is connected between nodes 101 and 103. Capacitive element Cout may or may not form part of switched-mode power supply 1.

Switched-mode power supply 1 comprises two switching MOS transistors T1 and T2. Transistors T1 and T2 here have an N channel. Transistors T1 and T2 are series-connected between nodes 101 and 103. More particularly, transistor T1 has a conduction terminal, for example, its source, connected to node 101, and another conduction terminal, for example, its drain, connected to a node 104, transistor T2 having a conduction terminal, for example, its source, connected to node 104, and another conduction terminal, for example, its drain, connected to node 103.

Switched-mode power supply 1 comprises an inductance L. In this case where switched-mode power supply 1 is of boost type, inductance L couples node 102 to node 104. In other words, inductance L has a first terminal or electrode connected to node 102 and a second terminal or electrode coupled or connected to the connection node 104 between transistors T1 and T2.

Transistors T1 and T2 are controlled to implement phases of power storage in inductance L and phases of delivery of the power stored in inductance L to capacitive element Cout. More particularly, during a phase of power storage in inductance L, transistors T1 and T2 are respectively on (conductive) and off (clamped). A current then flows through inductance L, from node 102 at potential Vbat to node 101 at potential GND, node 104 being at the same potential as node 101 if the voltage drop in transistor T1 is neglected. During a phase of delivery, to capacitive element Cout, of the power stored in inductance L, transistors T1 and T2 are respectively off and on. A current then flows through inductance L, from node 102 to node 103, node 104 being at the same potential as node 103 if the voltage drop in transistor T2 is neglected.

Switched-mode power supply 1 comprises a circuit $D_H$ for controlling transistor T2 and a circuit $D_L$ for controlling transistor T1. Circuit $D_L$ is configured to deliver a control signal cmd1, typically a potential, to a control terminal or gate of transistor T1, circuit $D_H$ being configured to deliver a control signal cmd2, typically a potential, to a control terminal or gate of transistor T2. Signal cmd1, respectively cmd2, is a periodic signal switched between a high level for which, in this example, transistor T1, respectively T2, is clamped and a low level for which, in this example, transistor T1, respectively T2, is clamped. For example, in some embodiments, signals cmd1 and cmd2 are pulse-width modulated (PWM) signals, the duty cycle of signals cmd1 and cmd2 then determining the duration of a power storage phase with respect to the duration of a power delivery phase. In some embodiments, signals cmd1 and cmd2 may also be pulse frequency modulation (PFM) signals.

Circuits $D_L$ and $D_H$ are configured to generate the control signals cmd1 and cmd2 of transistors T1 and T2 from one or a plurality of control signals delivered by a control circuit CTRL of switched-mode power supply 1. In other words, circuit $D_L$ is a circuit of close control ("driver") of transistor T1, and circuit $D_H$ is a driver of transistor T2. In this example, circuit CTRL delivers a control signal cmd1' to circuit $D_L$ and a control signal cmd2' to circuit $D_H$. Signals cmd1' and cmd2' are for example PWM or PFM signals.

More particularly, transistors T1 and T2 are controlled so that the value of potential Vout is equal to set point value Vref. For this purpose, switched-mode power supply 1 comprises a circuit COMP configured to deliver a signal sig_comp representative of the difference between the current value of potential Vout and set point value Vref. Signal sig_comp is received by the circuit CTRL which determines the signals cmd1' and cmd2', for example, their duty cycles, from signal sig_comp, so that potential Vout is equal to value Vref. Although it has been shown in FIG. 1 that circuit COMP receives potential Vout and set point value Vref, in known fashion circuit COMP may also receive a signal representative of this set point value Vref, for example, a potential having a value proportional to and smaller than set point value Vref, and a signal representative of the value of potential Vout, for example a potential having a value proportional to and smaller than that of potential Vout.

In switched-mode power supply 1, circuits $D_L$ and $D_H$ are powered from potential Vbat. As a result, the high level of signal cmd1 and the high level of signal cmd2 depend on the value of potential Vbat.

More particularly, circuit $D_L$ is powered with potential Vbat and circuit $D_H$ is powered with a potential Vbat+CP. Potential Vbat+CP is obtained from potential Vbat, so that the difference between potential Vbat and the potential of node 101 is equal to the difference between potential Vbat+CP and the potential of node 104.

Thus, in switched-mode power supply 1, when signal cmd1 is at potential Vbat and transistor T1 is on, the potential difference between the gate and the source of transistor T1 is equal to Vbat. Further, when signal cmd2 is at potential Vbat+CP and transistor T2 is on while transistor T1 is off, the potential difference between the gate and the source of transistor T2 is equal to Vbat.

The switching transistors of a switched-mode power supply, for example, transistors T1 and T2 of switched-mode power supply 1, are generally sized so that their on-state resistance is smaller than or equal to a targeted value. Indeed, the efficiency of the switched-mode power supply decreases when the on-state resistance of these switching transistors increases.

The on-state resistance of a MOS transistor may be decreased by increase of the potential difference applied between its source and its gate to turn it on, or by increase of the transistor dimensions. In the case where, as in switched-mode power supply 1, this potential difference between the source and the gate of transistors T1 and T2 is equal to Vbat, that is, to the potential difference between nodes 102 and 101, if this potential Vbat is too low for the on-state resistance of transistors T1 and T2 to be smaller than or equal to the targeted value, the dimensions of the switching transistors, and thus of the switched-mode power supply, should be increased, which may be not desirable, for example, when the surface area available to implement these devices is limited, for example, to limit the cost of these devices.

Further, when the input potential of a switched-mode power supply is delivered by a battery, the value of this potential may decrease during the use of the switched-mode power supply, because of a progressive discharge of the battery. As a result, the on-state resistance of the switching transistors of the switched-mode power supply may increase during the use of the switched-mode power supply, which is not desirable, for example, since the devices should then be sized for the worst case, that is, when potential Vbat is minimum.

The inventor here provides taking advantage of the fact that the output potential Vout of a boost-type switched-mode power supply is greater than its input potential Vbat, to electrically power circuits for controlling the switching transistors of the switched-mode power supply from potential Vout. This particularly enables to increase the potential difference applied between the gate and the source of a switching transistor to turn it on with respect to the case where its control circuit is powered from the input potential Vbat of the switched-mode power supply.

Figure 2:
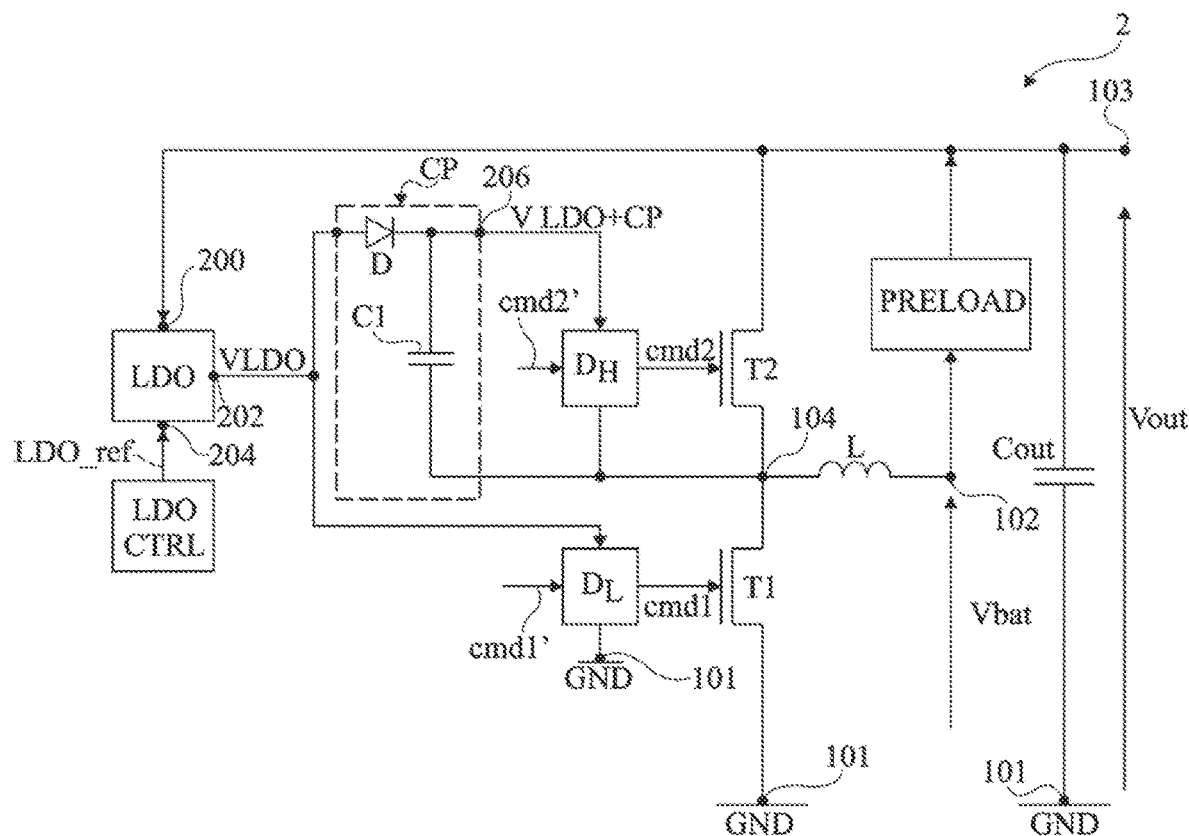
FIG. 2 illustrates an embodiment of a boost-type switched mode power supply.

FIG. 2 illustrates an embodiment of a boost-type switched-mode power supply 2.

Switched-mode power supply 2 is similar to the switched-mode power supply 1 of FIG. 1, and only the differences between these two switched-mode power supplies 1 and 2 are here highlighted. Thus, all that has been indicated for switched-mode power supply 1 applies, unless indicated otherwise, to switched-mode power supply 2. In FIG. 2, the circuit COMP and the circuit CTRL of switched-mode power supply 2 have not been shown.

Switched-mode power supply 2 differs from switched-mode power supply 1 in that its circuits $D_L$ and $D_H$ are not powered from potential Vbat, but from potential Vout.

For this purpose, switched-mode power supply 2 comprises a low drop-out voltage regulator LDO. Voltage regulator LDO is configured to deliver an intermediate potential VLDO from potential Vbat. In this example, potential VLDO is positive.

More particularly, regulator LDO is configured to deliver potential VLDO at a value equal to a set point value LDO_ref. Potential VLDO is smaller than or equal to potential Vout, or, in other words, set point value LDO_ref is smaller than or equal to set point value Vref. According to an embodiment, potential VLDO is greater than potential Vbat, or, in other words, set point value LDO_ref is greater than the value of potential Vbat.

Regulator LDO comprises a terminal 200 coupled, preferably connected, to node 103 to receive potential Vout, and a terminal 202 configured to deliver potential VLDO. Regulator LDO further comprises a terminal 204 configured to receive a signal representative of set point value LDO_ref. The signal representative of value LDO_ref is delivered by a control circuit LDO CTRL of regulator LDO, where this circuit LDO CTRL may form part of circuit CTRL (not shown in FIG. 2, see FIG. 1).

In this embodiment, the two circuits $D_L$ and $D_H$ are powered from potential VLDO. More particularly, circuit $D_L$ is powered with potential VLDO, and circuit $D_H$ is powered with a potential VLDO+CP obtained from potential VLDO. More particularly, potential VLDO+CP is generated so that the difference between potential VLDO and the potential of node 101 is equal to the difference between potential VLDO+CP and the potential of node 104.

Switched-mode power supply 2 comprises a charge pump CP configured to deliver potential VLDO+CP from potential VLDO. In other words, charge pump CP is configured to deliver a potential VLDO+CP equal to potential VLDO plus the potential of node 104. Still in other words, charge pump CP is configured to deliver potential VLDO+CP so that the difference between potential VLDO and the potential of node 101 is equal to the difference between potential VLDO+CP and the potential of node 104.

According to an embodiment, charge pump CP comprises a diode D and a capacitive element C1. Diode D has an electrode, preferably its anode, connected to the output node 202 of regulator LDO, and another electrode, preferably its cathode, connected to an output node 206 of charge pump CP. Capacitive element C is connected between node 104 and node 206. Node 206 is configured to deliver potential VLDO+CP. Circuit $D_H$ is connected to node 206 to receive potential VLDO+CP. More particularly, circuit $D_H$ is further connected to node 104, to be powered by the potential difference between nodes 206 and 104. According to an alternative embodiment, diode D is replaced with a transistor, for example, a MOS transistor, which has a threshold voltage lower than that of diode D and which is then adequately controlled by a signal originating from block CTRL and which has its source and its drain coupled, preferably connected, to respective nodes 202 and 206.

In switched-mode power supply 2, the high level of potential cmd1 is equal to potential VLDO and the low level of potential cmd1 is equal to potential GND, the high level of potential cmd2 being equal to potential VLDO+CP and the low level of potential cmd2 being equal to the potential of node 104. Thus, when potential cmd1 is switched to the high level to turn on transistor T1, the potential difference between the gate and the source of transistor T1 is equal to potential VLDO, that is, to the potential difference between nodes 202 and 101, and, when potential cmd2 is switched to the high level to turn on transistor T2, the potential difference between the gate and the source of transistor T2 is equal to potential VLDO, that is, to the potential difference between nodes 202 and 101.

It is thus possible to select a set point value VLDO_ref enabling to obtain an on-state resistance of transistors T1 and T2 which is smaller than or equal to a given value, without increasing the dimensions of transistors T1 and T2.

Further, as compared with the case of switched-mode power supply 1, when the value of potential Vbat is modified, this causes no modification of potential VLDO as long as potential Vout is maintained at a value greater than the set point value LDO_ref of potential VLDO.

According to an embodiment, switched-mode power supply 2 is configured to operate according to an operating mode selected among a plurality of operating modes. Each of these operating modes corresponds to a different set point value VLDO_ref delivered by circuit LDO CTRL. In other words, each of these operating modes determines, or corresponds to, a different compromise between the value of the on-state resistance of transistors T1 and T2 and the aging of transistors T1 and T2. Indeed, the higher set point value VLDO_ref, the higher the potential difference applied between the source and the gate of transistors T1 and T2 in the on state, which results in an acceleration of the aging of the transistors as well as in a decrease in the value of their on-state resistances.

According to an embodiment, as shown in FIG. 2, switched-mode power supply 2 comprises a circuit PRELOAD configured to precharge capacitive element Cout from potential Vbat. Circuit PRELOAD couples node 102 to node 103. This type of circuit enables to limit the inrush current pulled by capacitive element Cout when the potential difference between its terminals is smaller than the potential difference between nodes 102 and 101, for example, when the potential difference between the terminals of capacitive element Cout is zero.

Preferably, circuit PRELOAD comprises a switch, for example, a switch with a limited current, coupling node 102 to node 103. As an example, this switch is implemented by a P-channel MOS transistor with a pull up device to switch the potential applied to the gate and to the body of this transistor, between potential Vbat and potential Vout.

The provision of such a circuit PRELOAD enables to ease the starting of the LDO regulator and the first switchings to the on state of transistors T1 and T2.

Figure 3:
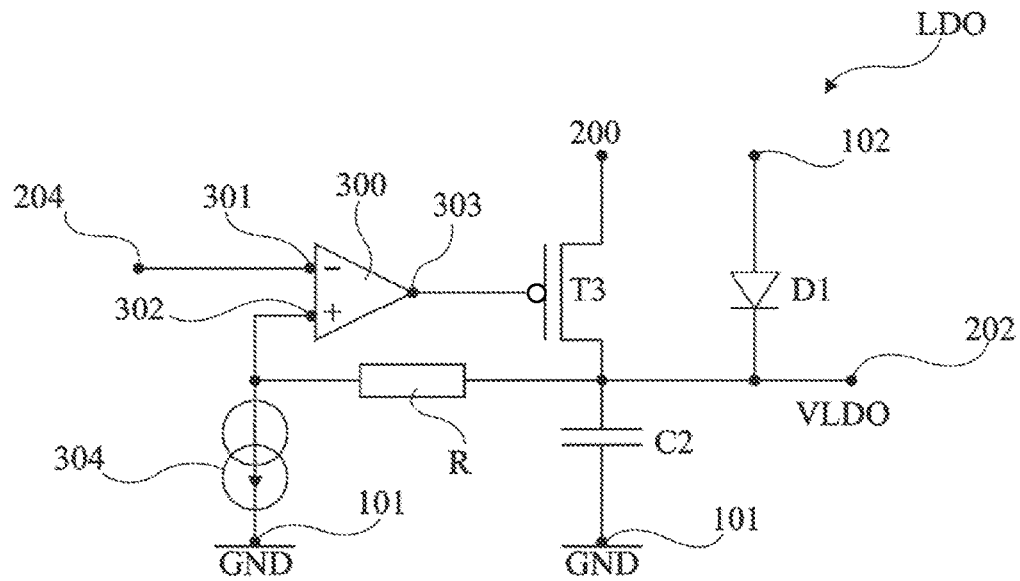
FIG. 3 shows in more detailed fashion an embodiment of a portion of the switched-mode power supply of FIG. 2.

FIG. 3 shows in further detail an embodiment of the LDO regulator of switched-mode power supply 2.

Regulator LDO comprises a MOS transistor T3, in this example with a P channel, having a conduction terminal, preferably its source, coupled, preferably connected, to node 103 and a conduction terminal, preferably its drain, connected to node 202 and configured to deliver potential VLDO.

Regulator LDO further comprises an operational amplifier 300 having a first input 301, preferably inverting (−), configured to receive a signal, typically a potential, representative of set point value LDO_ref, a second input 302, preferably non-inverting (+), coupled to node 202, and thus to the drain of transistor T3, to receive a potential representative of a current value of potential VLDO, and an output 303 coupled, preferably connected, to a control terminal or gate of transistor T3.

When the current value of potential VLDO deviates from its set point value VLDO_ref, this causes a modification of the output potential of amplifier 300, and thus of the potential difference between the gate and the source of transistor T3. This results in a modification of the voltage drop between the conduction terminals of transistor T3, and thus of the potential VLDO of node 202, enabling to take the current value of potential VLDO back to its set point value LDO_ref.

In the shown example, regulator LDO comprises a capacitive element C2 connected between node 202 and node 101. Capacitive element C2 enables to smooth, or average, transient variations of the current value of potential VLDO.

In the shown example, regulator LDO comprises a resistor R connected between node 202 and the input 302 of amplifier 300, as well as a current source 304 connected between input 302 and node 101. Source 304 delivers a bias current to resistor R. The potential on input 302 is thus equal to potential VLDO minus the voltage drop in resistor R, this voltage drop being determined by resistance value R and by the value of the current delivered by source 304. It should be noted that, in this example, the set point value LDO_ref of potential VLDO may be modified by modifying the current delivered by source 304 while the potential on input 301 of regulator LDO is left unchanged.

As shown in the example of FIG. 3, regulator LDO may further comprise a diode D1 coupling node 202 to node 102. Diode D1 is configured so that the potential of node 202 is at least equal to potential Vbat when potential Vout is smaller than potential Vbat. Diode D1 has a first electrode, in this example, its cathode, coupled preferably connected, to node 202, and a second electrode, in this example, its anode, coupled, preferably connected, to node 104.

The provision of diode enables to ease the starting of the LDO regulator and the first switchings to the on state of transistors T1 and T2 (FIG. 2). Diode D1 may be provided whether switched-mode power supply 2 (FIG. 2) comprises or not circuit PRELOAD. It should be noted that diode D1 may be suppressed, particularly if it limits the operating modes requested by circuit LDO CTRL (FIG. 2).

Embodiments and variants where the two transistors T1 and T2 have an N channel have been described hereinabove. Indeed, for identical dimensions, identical source, drain, and channel doping levels, and a same potential difference (in absolute value) between its source and its gate, an N-channel transistor has an on-state resistance smaller than that of a P-channel transistor.

However, in the case where transistor T2 is a P-channel MOS transistor having its source coupled or connected to node 103 and having its drain coupled or connected to node 104, its control circuit $D_H$ may also be powered from potential Vout. In this case, switched-mode power supply 2 comprises a second low drop-out regulator configured to deliver an additional power supply potential equal to potential Vout minus potential VLDO, that is, having a value equal to Vref minus LDO_ref. Circuit $D_H$ is then powered with the difference between potential Vout and the additional power supply potential. In this case, the high level of potential cmd2 is equal to potential Vout, and the low level of potential cmd2 is equal to potential Vout-VLDO, transistor T2 being on, respectively off, when potential cmd2 is at the low, respectively high, level. When potential cmd2 is at the low level (transistor T2 on), the potential difference between the gate and the source of transistor T2 is equal, in absolute value, to potential VLDO.

Further, although the case where potentials Vout and VLDO are positive with respect to reference potential GND, in the case where portion Vout is negative with respect to reference potential GND, N-channel transistors T1 and T2 are replaced with P-channel MOS transistors, and regulator LDO then delivers a potential VLDO negative with respect to reference potential GND. The implementation of such an alternative embodiment is within the abilities of those skilled in the art, for example, by providing to implement the transistors in an N-type substrate to avoid the turning on of the diodes between the substrate and the bodies where the transistors are implemented.

Further, it will be within the abilities of those skilled in the art to implement the described embodiments and variants in the case where switched-mode power supply 2 is of step down or buck type, that is, it is configured to deliver a potential Vout having a value smaller than that of potential Vbat. Indeed, the powering of control circuits $D_H$ and $D_L$ with a potential VLDO lower than potential Vbat then enables to control the aging of transistors T1 and T2 in the case where potential Vbat is too high to power circuits $D_H$ and $D_L$, for example in the case where potential Vbat is greater than 4 times the threshold voltage of transistors T1 and T2.

More generally, whatever the type of the switched-mode power supply, it will be within the abilities of those skilled in the art to provide powering circuits for controlling switching MOS transistors of the switched-mode power supply from an intermediate potential, this intermediate potential being generated by a low drop-out voltage regulator from the output potential of the switched-mode power supply.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given herein-above. In particular, the implementation of circuits $D_H$, $D_L$, CTRL, COMP, and LDO CTRL, is within the abilities of those skilled in the art.

What is claimed is:

1. A switched-mode power supply, comprising:
   a first node;
   a second node configured to receive a DC input voltage;
   a third node configured to receive a reference voltage;
   a first switching transistor and a second switching transistor, the first switching transistor configured to carry current from the second node to the first node, the second switching transistor configured to carry current from the second node to the reference voltage;
   a first circuit configured to control the first switching transistor; and
   a second circuit configured to control the second switching transistor, wherein the switched-mode power supply is configured to deliver an output voltage at the first node from the DC input voltage, and wherein the first and second circuits are configured to be powered from the output voltage.

2. The switched-mode power supply of claim 1, wherein a power supply set point value of the output voltage is greater than a value of the DC input voltage.

3. The switched-mode power supply of claim 1, further comprising a low drop-out voltage regulator configured to deliver, at an output node of the low drop-out voltage regulator, an intermediate regulated voltage from the output voltage, wherein the first and second circuits are configured to be powered from the intermediate regulated voltage.

4. The switched-mode power supply of claim 3, wherein the intermediate regulated voltage is smaller than the output voltage.

5. The switched-mode power supply of claim 4, wherein the intermediate regulated voltage is higher than the DC input voltage.

6. The switched-mode power supply of claim 3, wherein:
   the first switching transistor is coupled between the third node and a fourth node; and
   the second switching transistor is coupled between the fourth node and the first node, the switched-mode power supply further comprising an inductance coupling the second node to the fourth node.

7. The switched-mode power supply of claim 6, further comprising a charge pump configured to deliver, to a fifth node, a power supply voltage equal to a sum of the intermediate regulated voltage and of a voltage of the fourth node, wherein the first circuit is configured to be powered with the intermediate regulated voltage, and wherein the second circuit is configured to be powered with the power supply voltage.

8. The switched-mode power supply of claim 7, wherein the charge pump comprises:
   a diode having a first electrode coupled to the output node of the low drop-out voltage regulator, and a second electrode coupled to the fifth node; and
   a capacitive element coupled between the fourth node and the fifth node.

9. The switched-mode power supply of claim 7, wherein the charge pump comprises:
   a third transistor having a source coupled to the output node of the low drop-out voltage regulator, a drain coupled to the fifth node, and a control terminal configured to receive a control signal; and
   a capacitive element coupled between the fourth node and the fifth node.

10. The switched-mode power supply of claim 3, further comprising a third circuit configured to deliver a regulator set point value of the intermediate regulated voltage to the low drop-out voltage regulator.

11. The switched-mode power supply of claim 10, wherein the third circuit is configured to select the regulator set point value from among a plurality of regulator set point values according to an operating mode of the switched-mode power supply selected from among a plurality of operating modes.

12. The switched-mode power supply of claim 10, wherein the low drop-out voltage regulator comprises:
a third transistor having a first conduction terminal coupled to the first node and a second conduction terminal configured to deliver the intermediate regulated voltage; and
an operational amplifier having a first input configured to receive a voltage representative of the regulator set point value, a second input coupled to the second conduction terminal of the third transistor and configured to receive a voltage representative of a current value of the intermediate regulated voltage, and an output coupled to a control terminal of the third transistor.

13. The switched-mode power supply of claim 12, wherein the first conduction terminal of the third transistor is directly connected to the first node, wherein the first input of the operational amplifier is an inverting input, and wherein the second input of the operational amplifier is a non-inverting input.

14. The switched-mode power supply of claim 12, wherein the low drop-out voltage regulator further comprises:
a capacitive element coupled between the second conduction terminal of the third transistor and the third node;
a resistor coupling the second conduction terminal of the third transistor and the second input of the operational amplifier; and
a current source coupled between the third node and the second input of the operational amplifier.

15. The switched-mode power supply of claim 12, wherein the low drop-out voltage regulator further comprises a diode coupled between the second conduction terminal of the third transistor and the second node.

16. The switched-mode power supply of claim 1, wherein the first node is configured to be coupled to an output capacitive element, the switched-mode power supply further comprising a third circuit coupling the second node to the first node, the third circuit being configured to precharge the output capacitive element from the DC input voltage.

17. The switched-mode power supply of claim 16, wherein the third circuit comprises a switch coupling the second node to the first node.

18. The switched-mode power supply of claim 1, wherein the first and second switching transistors have an N channel.

19. The switched-mode power supply of claim 1, wherein the first and second switching transistors are metal-oxide semiconductor (MOS) transistors.

20. A method, comprising:
powering a first circuit for controlling a first switching transistor of a switched-mode power supply from an output voltage at a first node of the switched-mode power supply, the first switching transistor carrying current from a second node to the first node in response to the first switching transistor being ON, the second node receiving a DC input voltage; and
powering a second circuit for controlling a second switching transistor of the switched-mode power supply from the output voltage, the second switching transistor carrying current from the second node to a reference ground in response to the second switching transistor being ON.

21. The method of claim 20, further comprising generating, with a low drop-out voltage regulator, an intermediate voltage from the output voltage, wherein powering the first and second circuits comprises powering the first and second circuits from the intermediate voltage.

22. The method of claim 21, further comprising:
selecting an operating mode of the switched-mode power supply from among a plurality of operating modes;
determining a regulator set point value of the intermediate voltage based on selected operating mode of the switched-mode power supply; and
delivering the regulator set point value to the low drop-out voltage regulator.

23. The method of claim 20, wherein a current path of the first switching transistor is coupled to a current path of the second switching transistor at a first node, and wherein the current path of the first switching transistor is coupled between a second node and the first node, the method further comprising:
receiving a DC input voltage with an input terminal that is coupled to the first node via an inductor; and
generating the output voltage at the second node by switching the first and second switching transistors, wherein the output voltage is higher than the DC input voltage.

24. A circuit, comprising:
a first switching transistor having a current path coupled to an output terminal;
a first driver having an output coupled to a control terminal of the first switching transistor, an input configured to receive a first controlling signal, and first and second supply terminals, the first driver configured to control the switching of the first switching transistor based on the first controlling signal to regulate an output voltage at the output terminal to a target value;
a low drop-out voltage regulator having an input coupled to the output terminal, and an output coupled to the first supply terminal of the first driver, the low drop-out voltage regulator configured to deliver at the output of the low drop-out voltage regulator an intermediate regulated voltage from the output voltage to power the first driver; and
a circuit configured to deliver a regulator set point value of the intermediate regulated voltage to the low drop-out voltage regulator, the regular set point value selected from among a plurality of regulator set point values according to an operating mode of the circuit among a plurality of operating modes.

25. The circuit of claim 24, further comprising:
a diode having an anode coupled to the output of the low drop-out voltage regulator and a cathode coupled to the first supply terminal of the first driver; and
a capacitor coupled between the second supply terminal of the first driver and the cathode of the diode, wherein the second supply terminal of the first driver is coupled to the current path of the first switching transistor.

26. The circuit of claim 25, further comprising:
a second switching transistor having a current path coupled to the current path of the first switching transistor; and a second driver having an output coupled to a control terminal of the second switching transistor, an input configured to receive a second controlling signal, a first supply terminal coupled to the output of the low drop-out voltage regulator and to the anode of the diode, and a second supply terminal coupled to the current path of the second switching transistor, the second driver configured to control the switching of the second switching transistor based on the second controlling signal to regulate the output voltage at the output terminal to the target value.

27. The circuit of claim 26, further comprising an inductor having a first terminal coupled to current paths of the first and second switching transistors, and a second terminal configured to receive a DC input voltage.

* * * * *